(12) United States Patent
Mullaney et al.

(10) Patent No.: US 11,836,722 B2
(45) Date of Patent: Dec. 5, 2023

(54) SYSTEMS AND METHODS FOR ACCOUNT MATCHING BASED ON PARTIAL PROFILE DATA

(71) Applicant: JPMORGAN CHASE BANK, N.A., New York, NY (US)

(72) Inventors: Craig M. Mullaney, Newark, DE (US); Kevin J. Stauffer, Avondale, PA (US); Tuan Dao, Richardson, TX (US); Alwin M. Thomas, Newark, DE (US); Gary W. Moyer, Landenberg, PA (US); Sakthi Muthuswamy, Bear, DE (US); Sachin Gadiyar, Newark, DE (US); Muzeeb Mohammad, Greenville, DE (US); Prashant G. Paranjape, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 43 days.

(21) Appl. No.: 16/936,305

(22) Filed: Jul. 22, 2020

(65) Prior Publication Data

US 2021/0027296 A1    Jan. 28, 2021

Related U.S. Application Data

(60) Provisional application No. 62/877,347, filed on Jul. 23, 2019.

(51) Int. Cl.
*G06Q 20/40* (2012.01)
*G06Q 20/24* (2012.01)
(Continued)

(52) U.S. Cl.
CPC .......... *G06Q 20/401* (2013.01); *G06Q 20/24* (2013.01); *G06Q 20/405* (2013.01); *G06Q 20/425* (2013.01); *G06Q 40/02* (2013.01)

(58) Field of Classification Search
CPC .... G06Q 20/401; G06Q 20/24; G06Q 20/405; G06Q 20/425; G06Q 40/02
See application file for complete search history.

(56) References Cited

U.S. PATENT DOCUMENTS 9,767,474 B1 *  9/2017  Ramalingam ...... G06Q 30/0269
2009/0228365 A1 *  9/2009  Tomchek ............... G06Q 20/10
                                                  707/E17.014
(Continued)

FOREIGN PATENT DOCUMENTS

WO    WO-2015159105 A1 * 10/2015    ......... G06Q 30/0224

OTHER PUBLICATIONS

"Verifying Credit Cards," Forte, dated Oct. 17, 2018 https://web.archive.org/web/20181017180414/http://www.forte.net:80/devdocs/reference/verifying_credit_cards.htm (Year: 2018).*

(Continued)

*Primary Examiner* — Bennett M Sigmond
*Assistant Examiner* — Raven E Yono
(74) *Attorney, Agent, or Firm* — GREENBERG TRAURIG LLP

(57) ABSTRACT

Systems and methods for account matching based on partial profile data are disclosed. According to one embodiment, in an information processing apparatus comprising at least one computer processor, a method for account matching based on partial profile data may include: (1) receiving, from a merchant, partial payment card information for a merchant customer, wherein the merchant customer is also a financial institution customer; (2) querying a database to identify a plurality of payment card accounts matching the partial payment card information; (3) requesting a transaction over a payment network for the plurality of payment card accounts matching the partial payment card information; (4) monitoring the payment network for the transaction involv- (Continued)

ing one of the plurality of payment card accounts matching the partial payment card information; and (5) associating the payment card account involved in the transaction as the payment card account associated with the merchant customer.

18 Claims, 2 Drawing Sheets

(51) Int. Cl.
*G06Q 20/42* (2012.01)
*G06Q 40/02* (2023.01)

(56) References Cited

U.S. PATENT DOCUMENTS

| | | | |
|---|---|---|---|
| 2014/0074724 A1* | 3/2014 | Gordon | G06Q 20/023 |
| | | | 705/44 |
| 2018/0005242 A1* | 1/2018 | Miyamoto | G06Q 20/10 |
| 2018/0025354 A1* | 1/2018 | Groarke | G06Q 20/382 |
| | | | 705/44 |
| 2018/0101833 A1* | 4/2018 | Parekh | G06Q 20/38215 |
| 2018/0197171 A1* | 7/2018 | Steinman | G06Q 20/385 |

OTHER PUBLICATIONS

"Account Number Verification Service," Visa, dated Jun. 6, 2016 https://usa.visa.com/dam/VCOM/global/support-legal/documents/acct-numb-verif-service-a-quick-method-to-verify-accounts-vbs-07-jun-16.pdf (Year: 2016).*

* cited by examiner

SYSTEMS AND METHODS FOR ACCOUNT MATCHING BASED ON PARTIAL PROFILE DATA

RELATED APPLICATIONS

This application claims priority to, and the benefit of, U.S. Provisional Patent Application Ser. No. 62/877,347 filed Jul. 23, 2019, the disclosure of which is hereby incorporated, by reference, in its entirety.

BACKGROUND OF THE INVENTION

1. Field of the Invention

Embodiments are generally directed to systems and methods for account matching based on partial profile data.

2. Description of the Related Art

Financial institutions often seek to match, link, or otherwise associate their customer's accounts with accounts that the customer may have with third-party partners of the financial institution. The third-party partners, however, may not be able to provide the financial institution with the customer's entire financial institution account number (e.g., the customer's complete debit or credit card number). Therefore, it is difficult for the financial institution to associate these accounts.

SUMMARY OF THE INVENTION

Systems and methods for account matching based on partial profile data are disclosed. According to one embodiment, in an information processing apparatus comprising at least one computer processor, a method for account matching based on partial profile data may include: (1) receiving, from a merchant, partial payment card information for a merchant customer, wherein the merchant customer is also a financial institution customer; (2) querying a database to identify a plurality of payment card accounts matching the partial payment card information; (3) requesting a transaction over a payment network for the plurality of payment card accounts matching the partial payment card information; (4) monitoring the payment network for the transaction involving one of the plurality of payment card accounts matching the partial payment card information; and (5) associating the payment card account involved in the transaction as the payment card account associated with the merchant customer.

In one embodiment, the method may further include receiving, from the merchant, a merchant customer identifier for the merchant customer; and associating the merchant customer identifier with the payment card account involved in the transaction.

In one embodiment, the payment card may include a credit card.

In one embodiment, the partial payment card information may include fewer than all digits of a payment card account, a last four digits of the payment card account, a first six digits of the payment card account, combinations thereof, etc.

In one embodiment, the transaction may include an authorization transaction or a pre-authorization transaction, may be for a nominal amount, may include an Address Verification Service transaction, may include a Payment Account Validation transaction, combinations thereof, etc.

According to another embodiment, a system for payment card account matching based on partial profile data may include: a financial institution including a database comprising payment card information for a plurality of financial institution customers and a server executing a matching engine; a merchant having partial payment card information and a merchant customer account number for a merchant customer; and a third party payment processor storing payment card information for the financial institution customer. The matching engine may receive, from the merchant, the partial payment card information for the merchant customer, wherein the merchant customer is one of the plurality of financial institution customers; may query the database to identify a plurality of payment card accounts matching the partial payment card information; may request a transaction from the third party payment processor over a payment network for the plurality of payment card accounts matching the partial payment card information; may monitor the payment network for the transaction involving one of the plurality of payment card accounts matching the partial payment card information; and may associate the payment card account involved in the transaction as the payment card account associated with the merchant customer.

In one embodiment, the matching engine may also receive, from the merchant, the merchant customer identifier for the financial institution customer; and may also associate the merchant customer identifier with the payment card account involved in the transaction.

In one embodiment, the payment card may include a credit card.

In one embodiment, the partial payment card information may include fewer than all digits of a payment card account, a last four digits of the payment card account, a first six digits of the payment card account, combinations thereof, etc.

In one embodiment, the transaction may include an authorization transaction or a pre-authorization transaction, may be for a nominal amount, may include an Address Verification Service transaction, may include a Payment Account Validation transaction, combinations thereof, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for payment card account matching based on partial profile data.

Embodiments may use a matching engine that may implement a hierarchy of decision making and pattern matching to accomplish a unique account to account linkage in the presence of incomplete profile data. For example, when only partial payment card information is received (e.g., the first six digits and last four digits of a credit card number), a financial institution backend may attempt to identify a payment card account that is associated with these digits. Additional, fewer, or different digits may be provided; the greater number of digits provided, the higher the likelihood that a unique customer account will be identified.

Additional information provided by the merchant, such as a zip code, CVV2, last name, email address, etc., may also be used to match the customer. The information, however, may be outdated or incorrect, so it may not be accurate.

If a unique payment card account is identified from the partial payment card account information, the unique payment card account may be associated with an identifier for a customer account that the customer may have with the merchant. Any other suitable action may be taken as is necessary and/or desired.

If more than one payment card account is identified as potentially matching the partial account information (i.e., there are more than one payment card accounts that match the partial payment account information), the financial institution backend may instruct the merchant to have the third party payment processor to conduct a test transaction (e.g., a transaction/communication over the payment network, such as a $0 authorization, a transaction for a nominal amount (e.g., less than $0.05), a transaction preauthorization, an Address Verification Service (AVS) communication, a Payment Account Validation (PAV) communication, etc.) to cause a transaction to appear on one of the accounts over a payment network. The payment card account with the transaction is then associated with the customer account identifier that the customer has with the merchant.

In another embodiment, the third party payment processor may communicate complete payment card account information directly to the financial institution.

Figure 1:
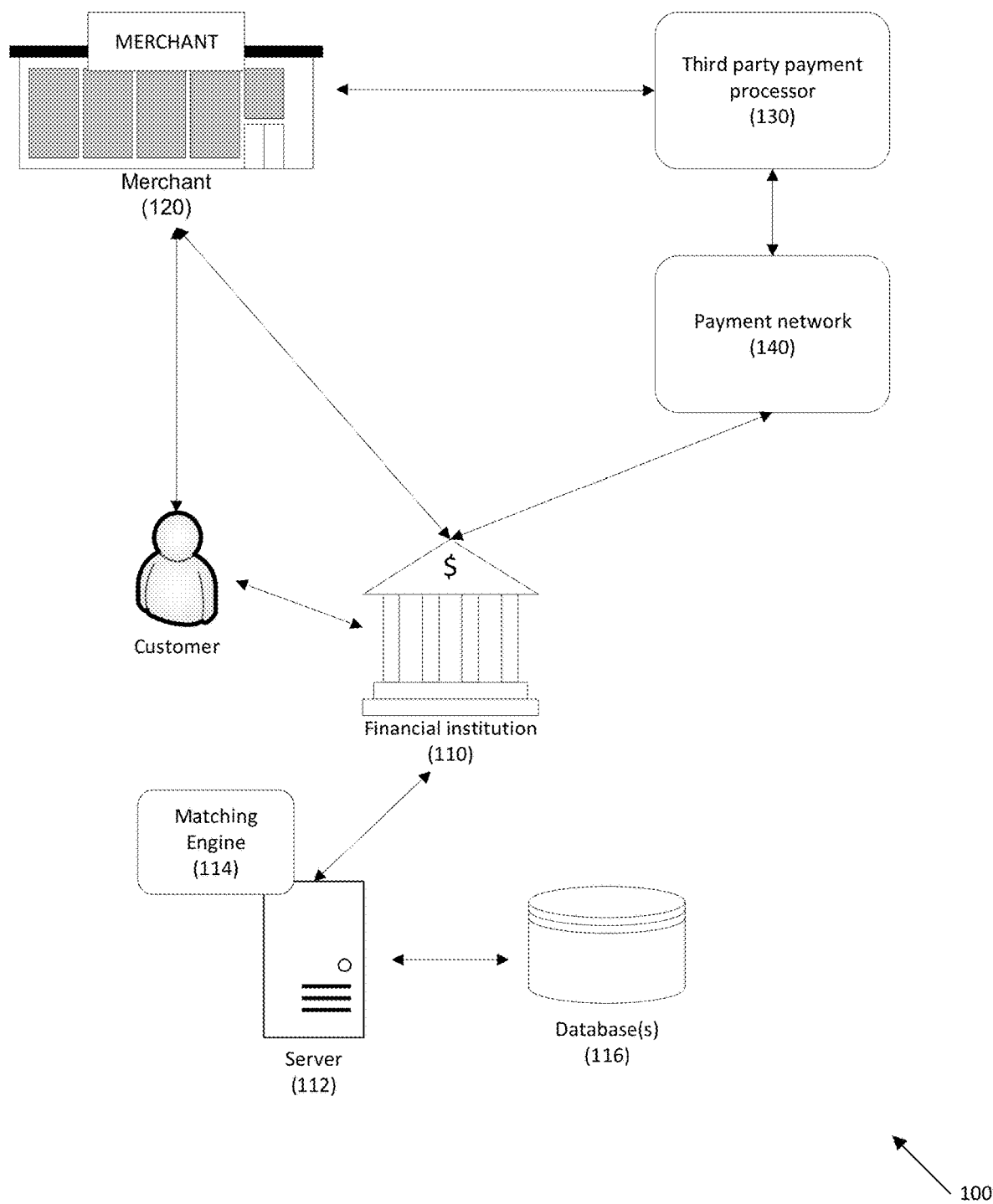
FIG. 1 depicts a system for account matching based on partial profile data according to one embodiment.

Referring to FIG. 1, a system for account matching based on partial profile data is disclosed according to one embodiment. System 100 may include financial institution 110 that may host server 112 and database 116. In one embodiment, server 112 may be any suitable computing device, including one or more server that may be physically hosted by financial institution 110, cloud-based servers, combinations thereof, etc.

Database 116 may store customer account information. In one embodiment, database 116 may store an association of the customer account with a merchant account; in another embodiment, a separate database (not shown) may store this association.

In one embodiment, financial institution 110 may be an issuer of payment cards, such as credit cards, and may maintain payment card numbers, expiration dates, billing addresses and/or zip codes, etc. for its customers. In one embodiment, financial institution 110 may further store past expiration dates, prior addresses, and any other information as is necessary and/or desired.

System 100 may also include merchant 120, which may be any suitable provider of a good or service. Merchant 120 may use third party payment processor 130 to process payments. In order to minimize requirements for Payment Card Industry (PCI), merchant 120 may not store an entire payment card number for its customers. Instead, it may use third party payment processor 130 to maintain payment card information for its customers, and may instead maintain partial payment card information, such as the first six digits and last four digits of the payment card. Merchant 120 may further maintain information such as expiration date, billing address and/or billing zip code, etc.

Merchant 120 may maintain a customer account number or identifier for its customers, and may provide the customer account number or identifier to financial institution 110 so that financial institution 110 may associate or link the payment card information to the merchant's customer account number or identifier. Merchant 120 may further provide the partial payment card information, and any other payment card information it may maintain, such as expiration date, billing address, billing zip code, etc.

In one embodiment, third party payment processor 130 may conduct a transaction or communicate with financial institution 110 over payment network 140. In one embodiment, third party payment processor 130 may maintain complete payment card information for merchant 120. In another embodiment, third party payment processor 130 may maintain a token for the payment card.

In one embodiment, third party payment processor may conduct the transaction as a card on file transaction using payment network 140.

Server 112 may execute matching engine 114 that may match the partial payment card information received from merchant 120 with financial institution 110's customer account information maintained in database 116. Matching engine 114 may further associate the merchant's customer account number or identifier with financial institution 110's payment card information for the customer.

Figure 2:
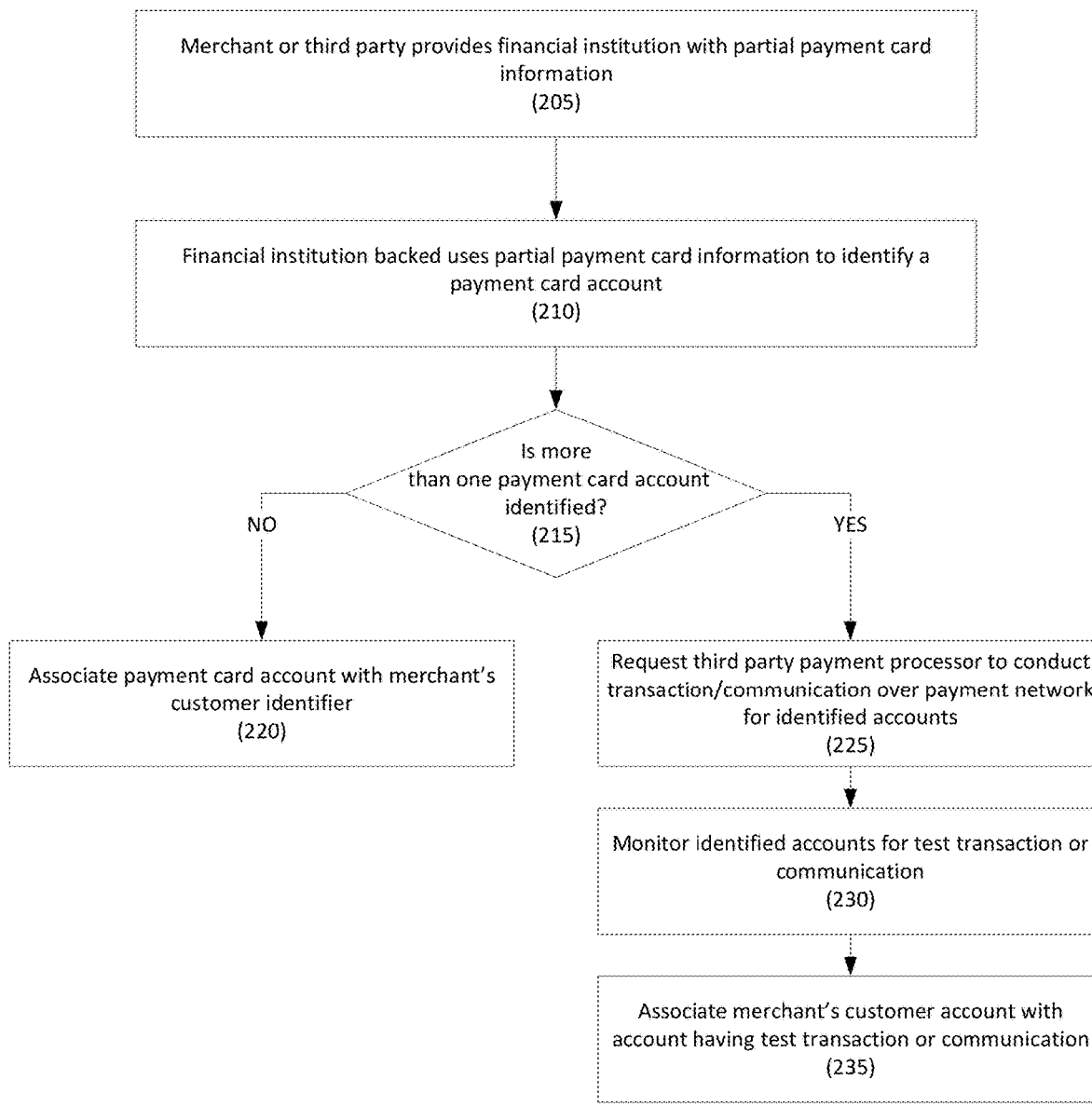
FIG. 2 illustrates a method for account matching based on partial profile data according to one embodiment.

Referring to FIG. 2, a method for account matching based on partial profile data is disclosed according to one embodiment. In step 205, a merchant may provide a financial institution with partial payment card information (e.g., certain digits of a credit card for the customer it may have on file). The merchant may not store the entire payment card account number in order to minimize PCI requirements. The merchant may also provide the financial institution with an account identifier for a customer account that the customer may have with the merchant.

In one embodiment, the partial payment card information may include the first six digits and the last four digits of a customer payment card account number. Additional, fewer, or different digits may be provided. In one embodiment, the merchant may further provide an expiration date, a customer address, a customer zip code, etc. if available.

In step 210, using the partial payment card information, a financial institution backend may search a database of customer accounts to identify one or more matching payment card accounts. In one embodiments, the financial institution backend may use a lookup, or it may optimize the search for bank identification number, geographic location, cobranded cards, etc. In one embodiment, machine learning may be used to optimize the search, such as searching for a card brand that customers are likely to use with the merchant due to rewards, etc.

In step 215, a check may be made to see if the search identified a unique payment card account (i.e., only a single payment card account was identified). If a single payment card account was identified, in step 220, the merchant's customer account may be associated with the unique payment card account, and the process may be complete.

If more than one payment card account was identified, in step 225, the financial institution may request that the merchant or the third-party payment processor conduct a test transaction or communication over a payment network. For example, the third-party payment processor may conduct a $0 authorization, an Address Verification Service (AVS), Payment Account Validation (PAV), a pre-authorization, a transaction for a nominal amount (e.g., less than $0.05 transaction) etc. Any other suitable transaction or communication that the financial institution may receive over the payment network may be used as is necessary and/or desired.

In one embodiment, the test transactions or communications may be conducted simultaneously, in another embodiment, the test transactions may be conducted in an order that is based on the probability the potential account number being a match. Other manners of conducting the test transaction may be used as is necessary and/or desired.

In step 230, the financial institution may monitor the identified payment card accounts for the authorization. For example, the financial institution may monitor its authorization system for a transaction or communication involving the identified payment card accounts received over the payment network. Once the transaction or communication is received, in step 235, the payment card account with the detected transaction or communication may be associated with the merchant's customer account.

Although multiple embodiments may be disclosed, these embodiments are not mutually exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for payment card account matching based on partial profile data, comprising:
   receiving, by a financial institution backend and from a merchant, a subset of digits for a complete account number for a payment instrument for a merchant customer, wherein the merchant customer is also a financial institution customer, the merchant does not store the complete account number for the payment instrument, and a third-party payment processor for the merchant stores the complete account number for the payment instrument;
   identifying, by the financial institution backend, a plurality of payment card accounts comprising the subset of digits in a financial institution database;
   identifying, by the financial institution backend and using machine learning, a first payment card account in the identified plurality of payment card accounts that has a brand with a highest probability of being used with the merchant;
   requesting, by the financial institution backend, the merchant to conduct a test transaction with the first payment card account over a payment network, wherein the merchant is configured to request the test transaction from the third-party payment processor and the third-party payment processor is configured to conduct the test transaction using a payment network;
   after requesting the merchant to conduct the test transaction, monitoring, by the financial institution backend, a transaction authorization system for the test transaction that involves the first payment card; and
   associating, by the financial institution backend, the first payment card account involved in the test transaction with the merchant customer.

2. The method of claim 1, further comprising:
   receiving, from the merchant, a merchant customer identifier for the merchant customer; and
   associating the merchant customer identifier with the first payment card account involved in the test transaction.

3. The method of claim 1, wherein the first payment card account is a credit card account.

4. The method of claim 1, wherein the subset of digits comprises a last four digits of the first payment card account.

5. The method of claim 1, wherein subset of digits comprises a first six digits of the first payment card account.

6. The method of claim 1, wherein the test transaction comprises an authorization transaction or a pre-authorization transaction.

7. The method of claim 1, wherein the test transaction is for a nominal amount.

8. The method of claim 1, wherein the test transaction comprises an Address Verification Service transaction.

9. The method of claim 1, wherein the test transaction comprises a Payment Account Validation transaction.

10. A system for payment card account matching based on partial profile data, comprising:
    a financial institution backend comprising:
        a database comprising complete account numbers for payment instruments for a plurality of financial institution customers;
        a transaction authorization system; and
        a server executing a matching engine;
    a merchant backend for a merchant that does not store the complete account number for payment instruments; and
    a third-party payment processor in communication with the merchant backend and a payment network;
    wherein:
        the matching engine is configured to receive, from the merchant, a subset of digits for a complete account number for a payment instrument for the merchant customer, wherein the merchant customer is one of the plurality of financial institution customers;
        the matching engine is configured to identify a plurality of payment card accounts comprising the subset of digits in the database;
        the matching engine is configured to identify, using machine learning, a first payment card account in the identified plurality of payment card accounts that has a brand with a highest probability of being used with the merchant;
        the matching engine is configured to request the merchant backend to conduct a test transaction using the third-party payment processor over a payment network with the first payment card account;
        the merchant backend is configured to receive the request and requests the third-party payment processor to conduct the test transaction;
        the third-party payment processor is configured to receive the request and conducts the test transaction using the payment network;
        after requesting the merchant to conduct the test transaction, the matching engine is configured to monitor a transaction authorization system for a transaction that involves the first payment card account; and
        the matching engine is configured to associate the first payment card account involved in the test transaction with the merchant customer.

11. The system of claim 10, wherein:
    the matching engine is configured to receive, from the merchant, a merchant customer identifier for a financial institution customer; and
    the matching engine is configured to associate the merchant customer identifier with the first payment card account involved in the test transaction.

12. The system of claim 10, wherein the first payment card account is a credit card account.

13. The system of claim 10, wherein the subset of digits comprises a last four digits of the first payment card account.

14. The system of claim 10, wherein the subset of digits comprises a first six digits of the first payment card account.

15. The system of claim 10, wherein the test transaction comprises an authorization transaction or a pre-authorization transaction.

16. The system of claim 10, wherein the test transaction is for a nominal amount.

17. The system of claim 10, wherein the test transaction comprises an Address Verification Service transaction.

18. The system of claim 10, wherein the test transaction comprises a Payment Account Validation transaction.

* * * * *